(12) United States Patent
Horiyama

(10) Patent No.: US 10,554,841 B2
(45) Date of Patent: Feb. 4, 2020

(54) IMAGE FORMING APPARATUS, CONTROL METHOD THEREOF AND MEDIUM

(71) Applicant: CANON KABUSHIKI KAISHA, Tokyo (JP)

(72) Inventor: Jun Horiyama, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/053,042

(22) Filed: Aug. 2, 2018

(65) Prior Publication Data

US 2019/0052760 A1 Feb. 14, 2019

(30) Foreign Application Priority Data

Aug. 10, 2017 (JP) .................................. 2017-155886

(51) Int. Cl.
*G06F 3/12* (2006.01)
*H04N 1/00* (2006.01)

(52) U.S. Cl.
CPC ................................. *H04N 1/0097* (2013.01)

(58) Field of Classification Search
CPC ......... H04N 1/0097; H04N 2201/0094; H04N 21/8545
See application file for complete search history.

(56) References Cited

U.S. PATENT DOCUMENTS

| 6,336,151 B1* | 1/2002 | Seki ...................... G06F 9/4411 709/217 |
| 8,320,002 B2 | 11/2012 | Horiyama |
| 8,893,151 B2 | 11/2014 | Horiyama |
| 2004/0229598 A1* | 11/2004 | Tajima .................... G01C 21/26 455/414.1 |
| 2005/0223011 A1 | 10/2005 | Horiyama |
| 2016/0337449 A1* | 11/2016 | Yang .................. H04N 21/4126 |
| 2018/0241633 A1 | 8/2018 | Horiyama |

FOREIGN PATENT DOCUMENTS

JP 2016127462 A 7/2016

* cited by examiner

*Primary Examiner* — Moustapha Diaby
(74) *Attorney, Agent, or Firm* — Venable LLP

(57) ABSTRACT

An operating panel of an image forming apparatus obtains a serial number of a main unit of the image forming apparatus upon being connected to the main unit. If a pre-stored serial number of the main unit is different from the obtained serial number, the operating panel deletes all applications installed in the operating panel, stores the serial number of the main unit in the operating panel, and then installs applications on the basis of application information present in the main unit.

12 Claims, 13 Drawing Sheets

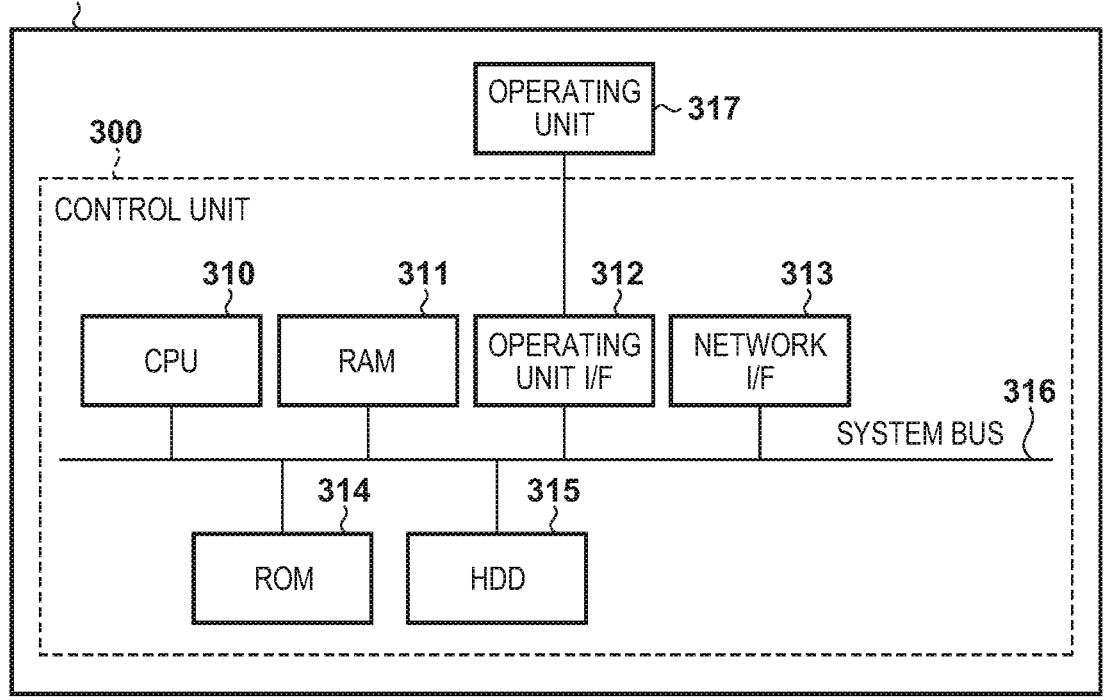
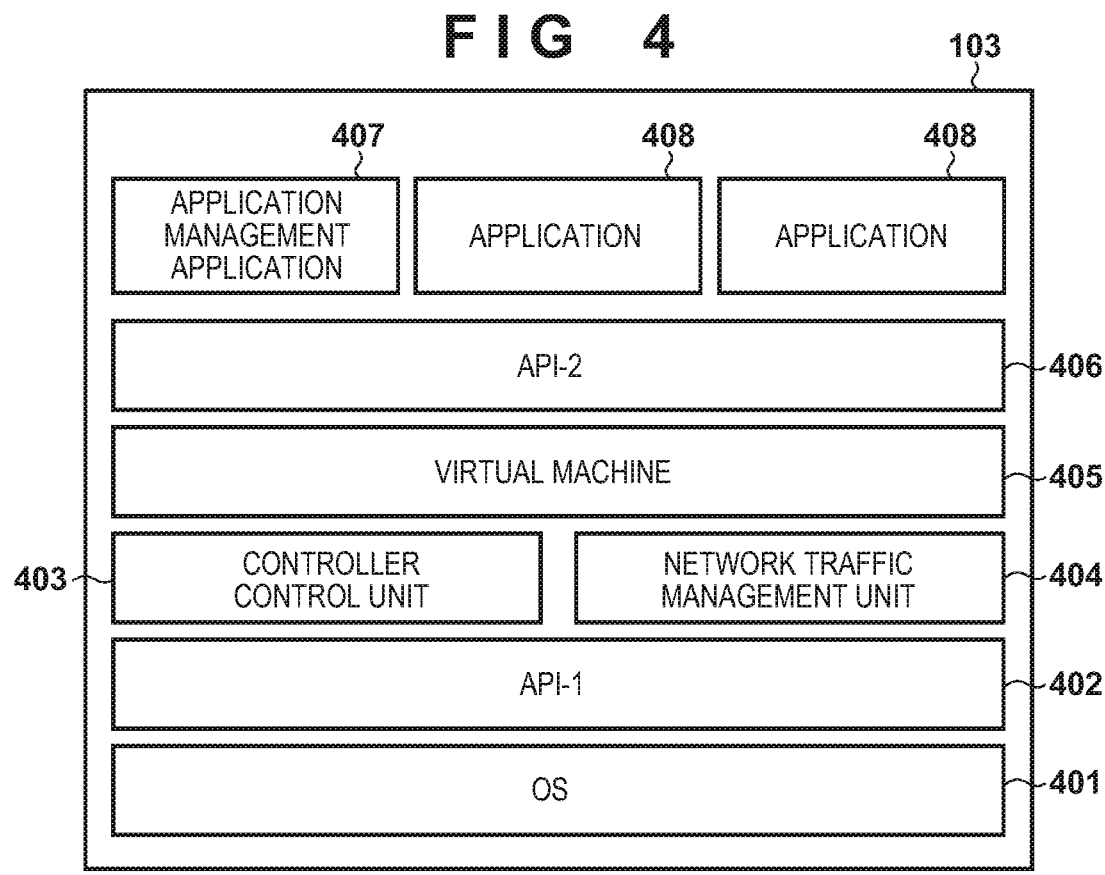

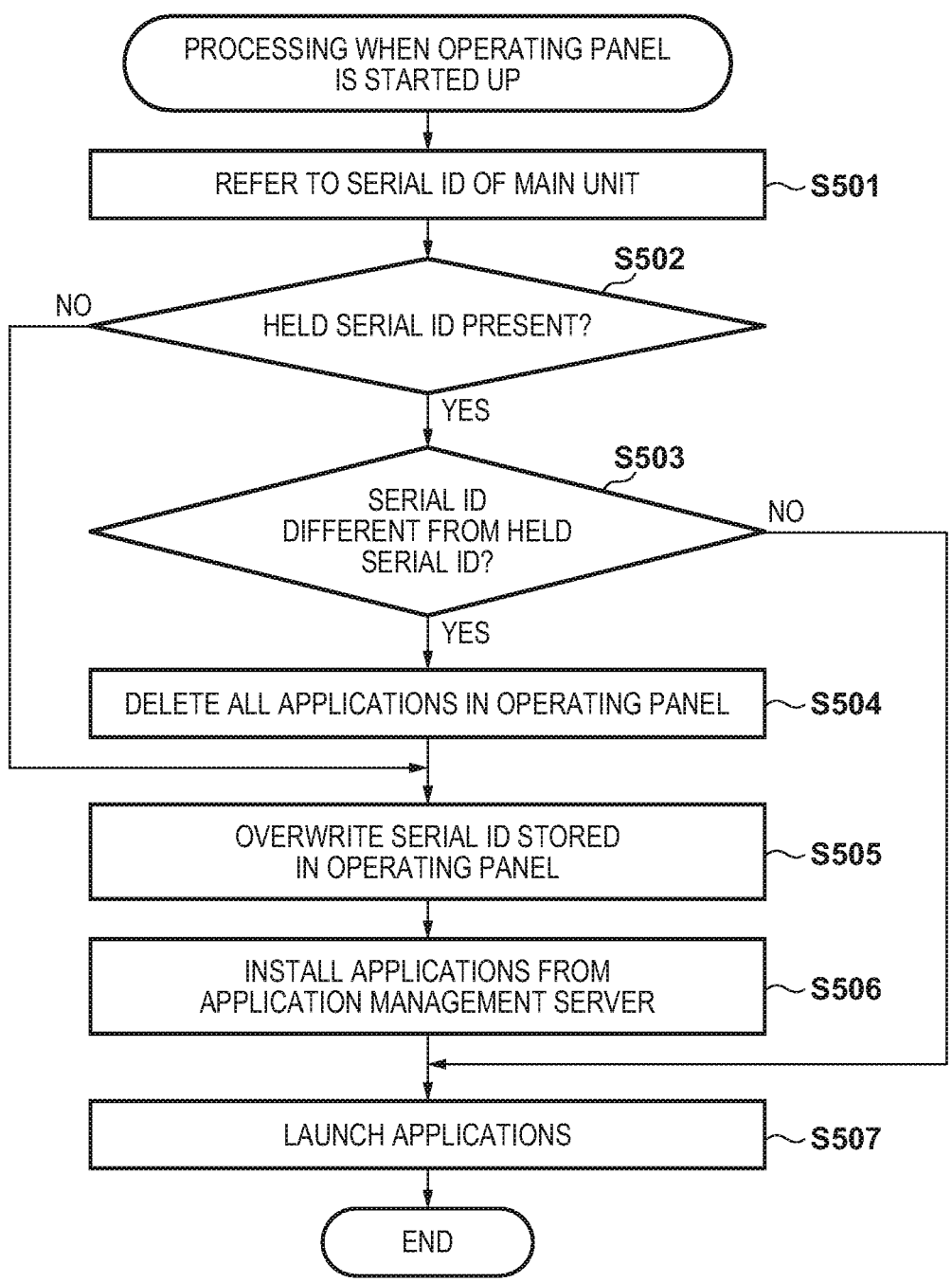

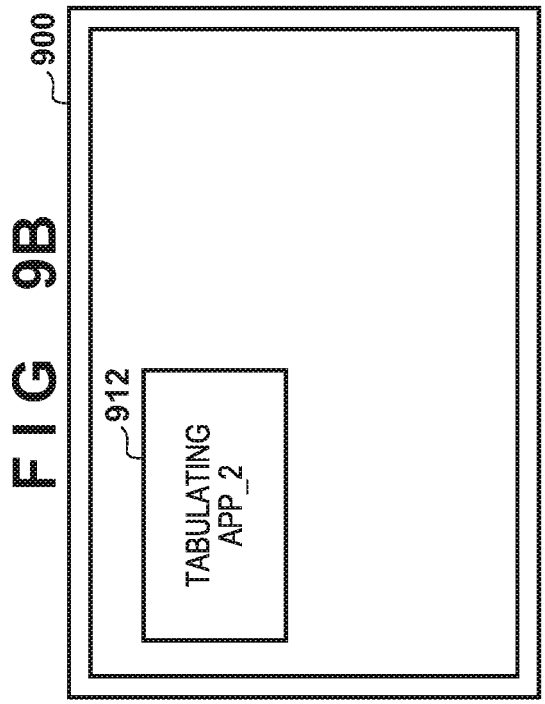
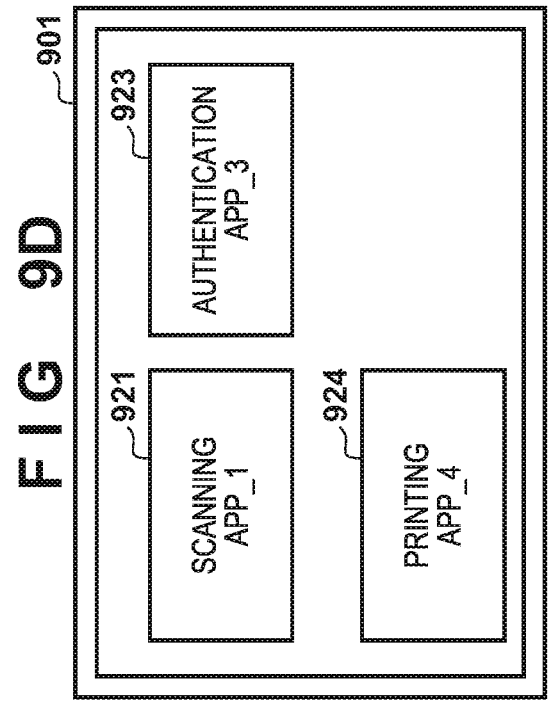
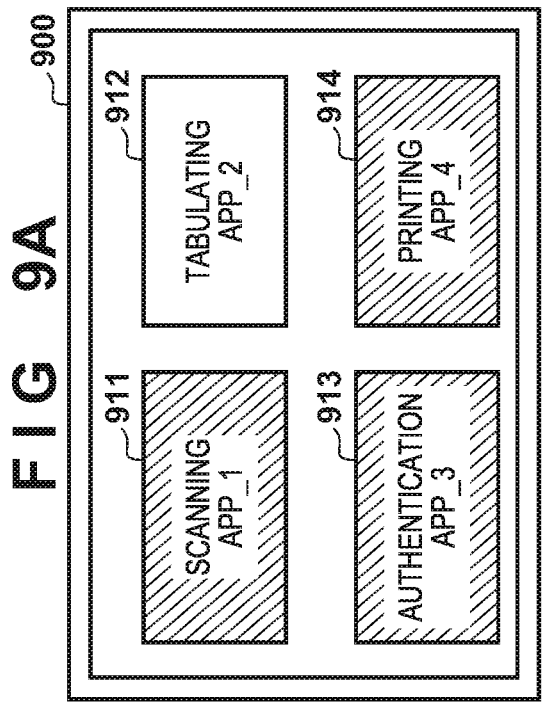
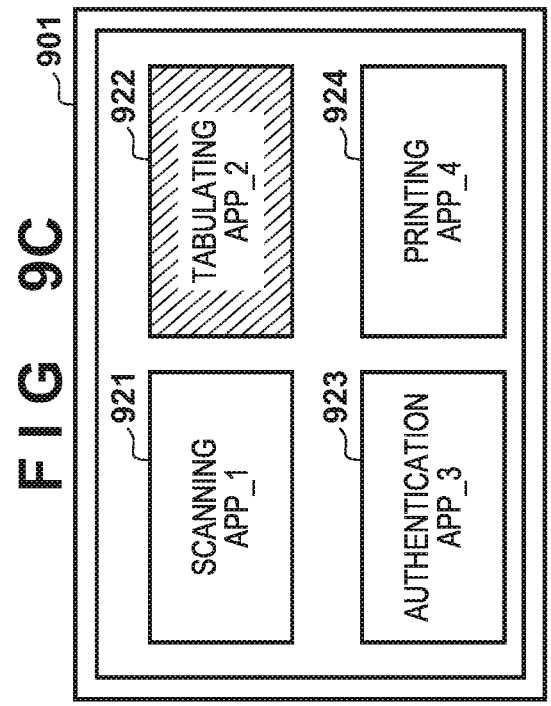

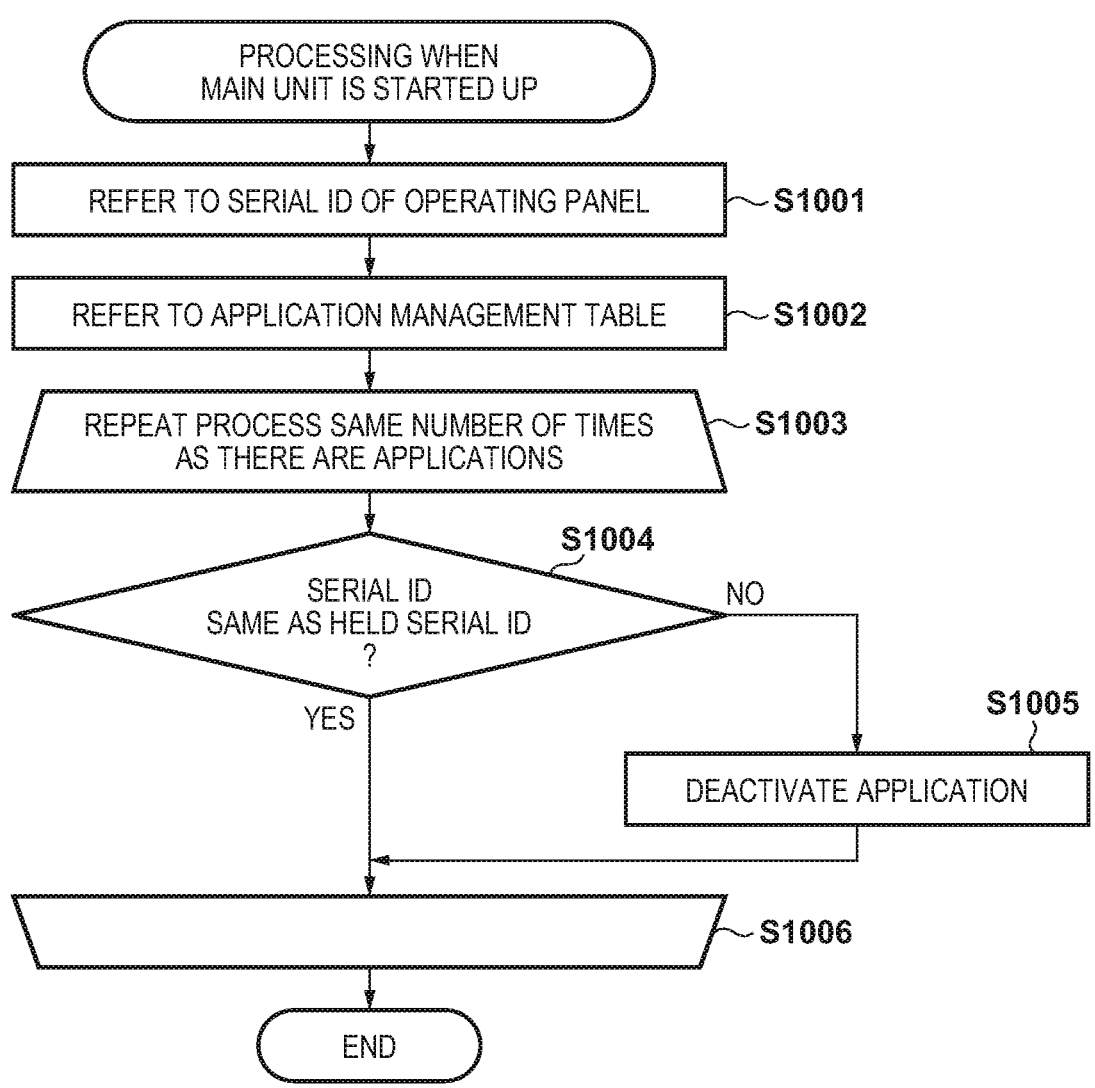

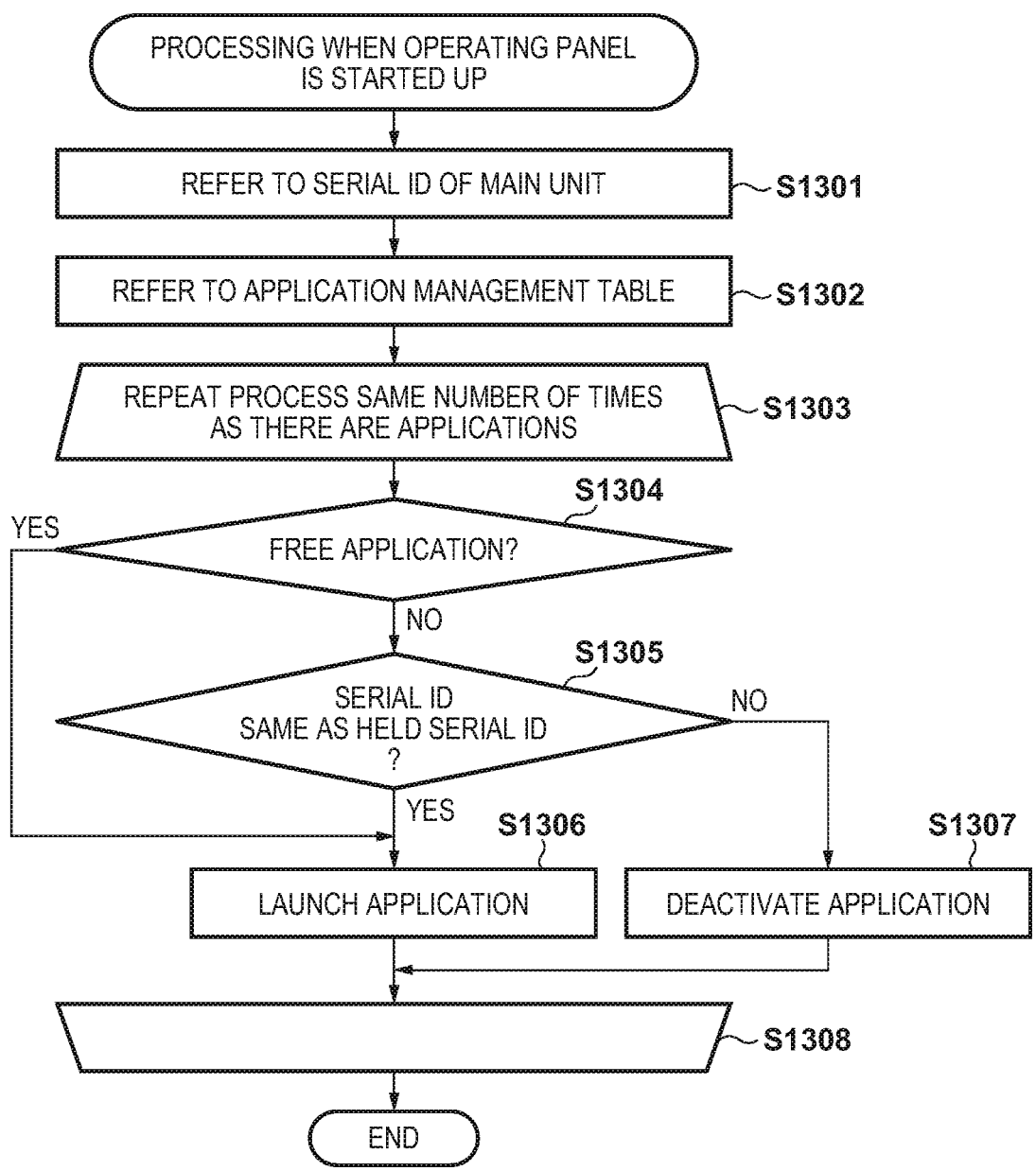

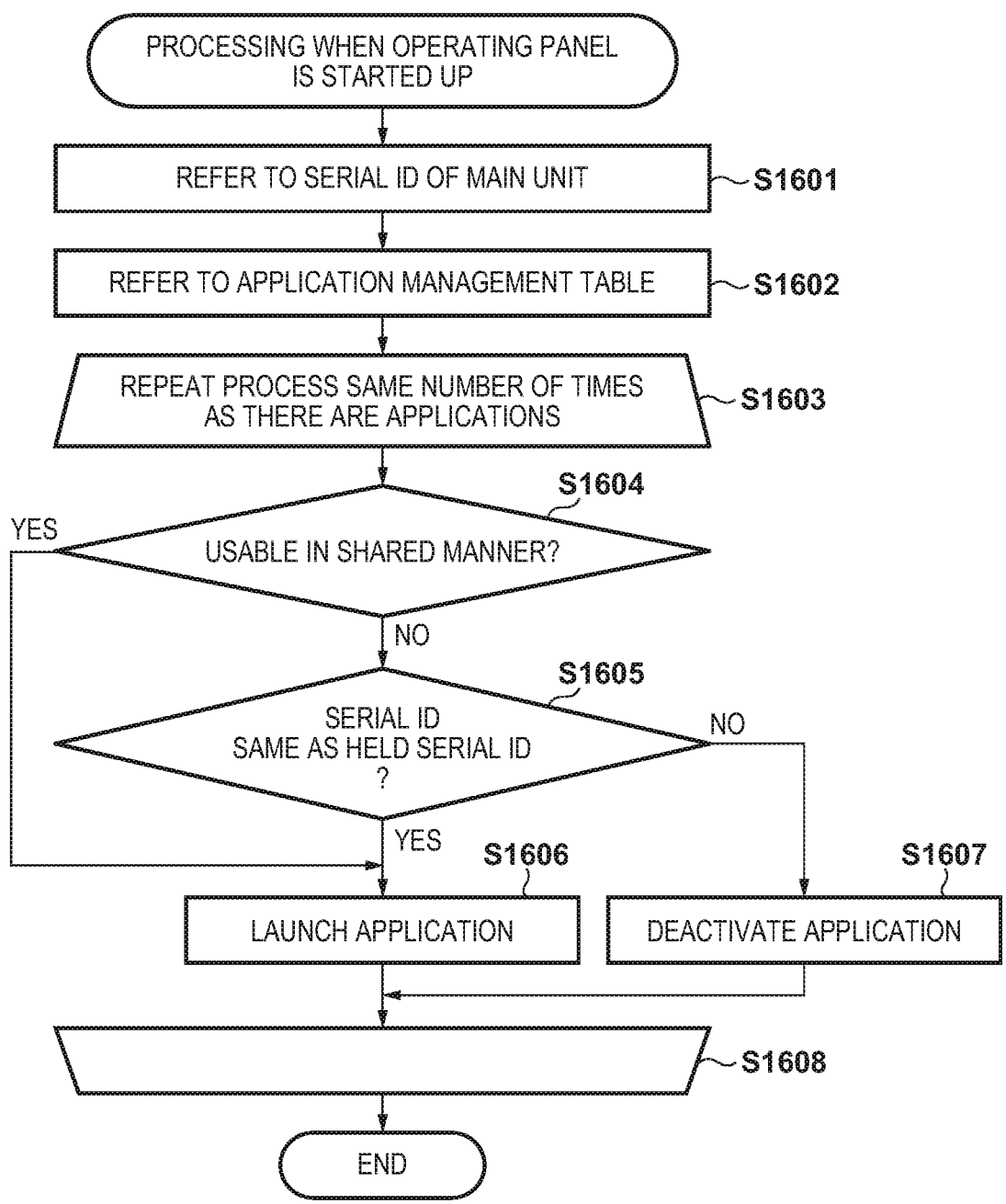

IMAGE FORMING APPARATUS, CONTROL METHOD THEREOF AND MEDIUM

BACKGROUND OF THE INVENTION

Field of the Invention

The present invention relates to an image forming apparatus, a control method thereof and a medium, and particularly relates to an image forming apparatus that can be separated into a main unit and an operating unit, and to a control method thereof.

Description of the Related Art

In an image forming apparatus known as a digital multifunction peripheral, a main unit implements not only functions such as copying and printing images and faxing, but also functions such as scanning images and sending the scans to a PC. An image forming apparatus in which an operating unit for making various instructions to the main unit is provided separate from the main unit is also known. Furthermore, installing additional application programs for the operating unit makes the image forming apparatus more convenient to use. For example, Japanese Patent Laid-Open No. 2016-127462 proposes a configuration in which a main unit and an operating unit of an image forming apparatus are separate, and the operating unit is capable of holding and executing application programs.

This configuration has an issue, however, in that there is demand for the ability to limit the combinations of main units and operating units in which application programs can be used, so that the application programs of the operating unit cannot be used in combinations including main units aside from a specific main unit.

SUMMARY OF THE INVENTION

The present invention provides an image forming apparatus, and a control method thereof, in which the use of an application program in an operating unit can be managed appropriately on the basis of main unit-operating unit combinations.

The present invention has the following configuration.

According to a first aspect of the present invention, there is provided an image forming apparatus comprising an operating unit in which applications can be installed and executed, and a main unit, wherein the operating unit and the main unit can be connected to and disconnected from each other, and wherein the operating unit includes: a saving unit configured to save identification information of the last main unit that was connected; and an installation control unit configured to, in the case where the identification information of a connected main unit and the identification information saved in the saving unit do not match, delete an installed application and reinstall the application through the connected main unit.

According to a second aspect of the present invention, there is provided an image forming apparatus comprising an operating unit in which applications can be installed and executed, and a main unit, wherein the operating unit and the main unit can be connected to and disconnected from each other, and the image forming apparatus further comprises: a holding unit configured to hold an application management table associating identification information of an application installed in the operating unit with a main unit connected at the time when the application was installed in the operating unit; and a control unit configured to, on the basis of the application management table, activate an application, among the applications installed in the operating unit, for which the main unit connected when the application was installed is the same as a currently-connected main unit, and deactivate the other applications.

According to a third aspect of the present invention, there is provided a non-transitory computer-readable medium storing a program that, when executed by a computer included in an image forming apparatus along with a main unit, capable of being connected to and disconnected from the main unit, and capable of installing and executing applications, causes the computer to function as: a saving unit configured to save identification information of the last main unit that was connected; and an installation control unit configured to, in the case where the identification information of a connected main unit and the identification information saved in the saving means do not match, delete an installed application and reinstall the application through the connected main unit.

According to a fourth aspect of the present invention, there is provided a non-transitory computer-readable medium storing a program that, when executed by a computer included in an image forming apparatus along with a main unit, capable of being connected to and disconnected from the main unit, and capable of installing and executing applications, causes the computer to function as: a holding unit configured to hold an application management table associating identification information of an application installed in the operating unit with a main unit connected at the time when the application was installed in the operating unit; and a control unit configured to, on the basis of the application management table, activate an application, among the applications installed in the operating unit, for which the main unit connected when the application was installed is the same as a currently-connected main unit, and deactivate the other applications.

According to a fifth aspect of the present invention, there is provided a non-transitory computer-readable medium storing a program that, when executed by a computer included in an image forming apparatus along with an operating unit, capable of being connected to and disconnected from the operating unit, and capable of installing and executing applications, causes the computer to function as: a holding unit configured to hold an application management table associating identification information of an application installed in the operating unit with a main unit connected at the time when the application was installed in the operating unit; and a control unit configured to, on the basis of the application management table, activate an application, among the applications installed in the operating unit, for which the main unit connected when the application was installed is the same as a currently-connected main unit, and deactivate the other applications.

According to a sixth aspect of the present invention, there is provided a control method of an image forming apparatus including an operating unit in which an application can be installed and executed, and a main unit, wherein the operating unit and the main unit can be connected to and disconnected from each other, and the method comprising: saving identification information of the last main unit that was connected; and in the case where the identification information of a connected main unit and the identification information saved in the saving means do not match, deleting an installed application and reinstalling the application through the connected main unit.

According to a seventh aspect of the present invention, there is provided a control method of an image forming apparatus including an operating unit in which an application can be installed and executed, and a main unit, wherein the operating unit and the main unit can be connected to and disconnected from each other, and the method comprising: holding an application management table associating identification information of an application installed in the operating unit with a main unit connected at the time when the application was installed in the operating unit; and on the basis of the application management table, activating an application, among the applications installed in the operating unit, for which the main unit connected when the application was installed is the same as a currently-connected main unit, and deactivating the other applications.

According to the present invention, an image forming apparatus in which the use of an application program in an operating unit can be managed appropriately on the basis of main unit-operating unit combinations can be provided.

Further features of the present invention will become apparent from the following description of exemplary embodiments (with reference to the attached drawings).

BRIEF DESCRIPTION OF THE DRAWINGS

FIG. 3 is a diagram illustrating an example of the hardware configuration of an application management server 105.

FIG. 4 is a diagram illustrating an example of the module configuration of software and the like of an operating panel 103.

FIG. 5 is a diagram illustrating an example of a flowchart indicating the details of processing by the operating panel 103 when the image forming apparatus is started up, according to a first embodiment.

FIG. 9A is a diagram illustrating an example of an image displayed in the operating panel 103, according to the second embodiment.

FIG. 9B is a diagram illustrating an example of an image displayed in the operating panel 103, according to the second embodiment.

FIG. 9C is a diagram illustrating an example of an image displayed in the operating panel 103, according to the second embodiment.

FIG. 9D is a diagram illustrating an example of an image displayed in the operating panel 103, according to the second embodiment.

FIG. 10 is a diagram illustrating an example of a flowchart indicating the details of processing by a main unit 102 when the image forming apparatus is started up, according to a third embodiment.

FIG. 13 is a diagram illustrating an example of a flowchart indicating the details of processing by an application management application, according to another embodiment.

FIG. 16 is a diagram illustrating an example of a flowchart indicating the details of processing by an application management application, according to another embodiment.

DESCRIPTION OF THE EMBODIMENTS

The following embodiments will describe, with reference to the drawings, a case where an operating panel of an image forming apparatus has been removed and then connected to another image forming apparatus.

First Embodiment

Overall System Configuration

Figure 1:
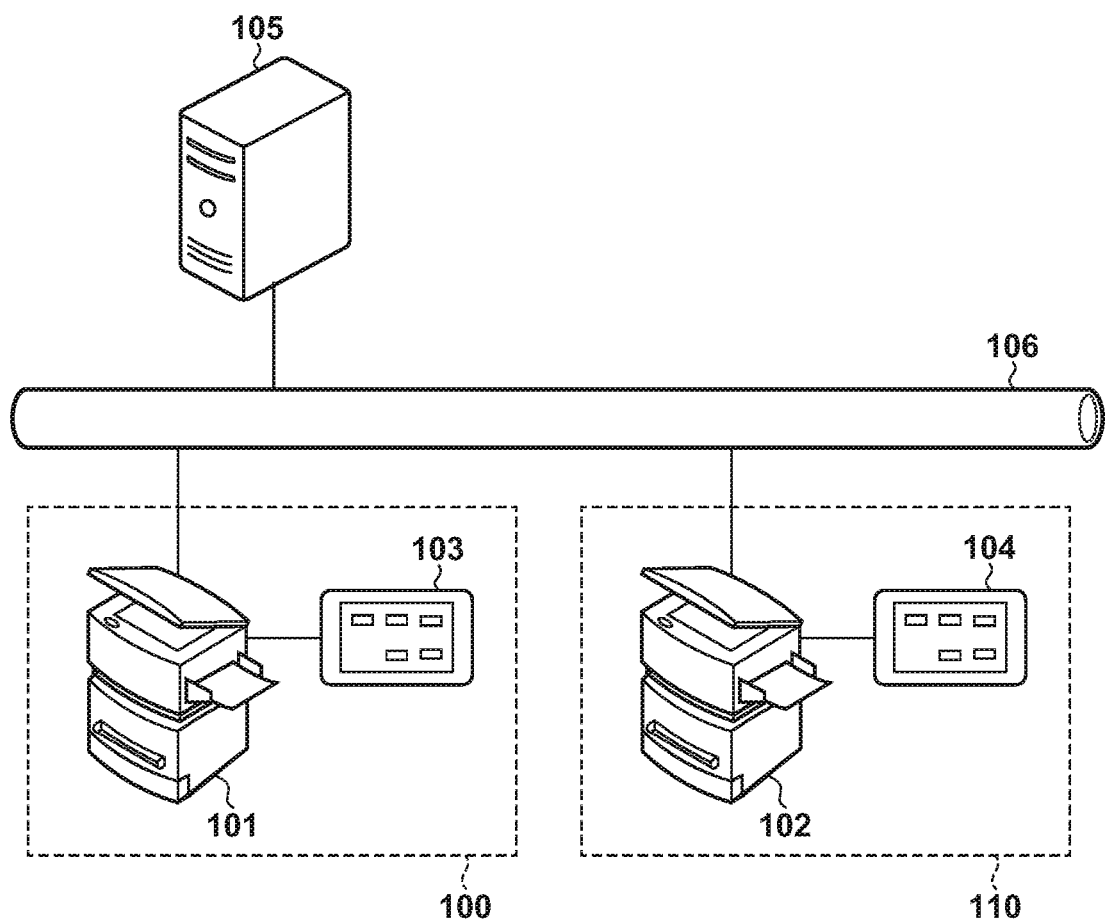
FIG. 1 is a diagram illustrating an example of the device configuration of an image forming apparatus control system.

FIG. 1 is a diagram illustrating an example of the device configuration of an image forming apparatus control system according to the present embodiment. The image forming apparatus control system according to the present embodiment is constituted by image forming apparatuses 100 and 110, a network 106, and an application management server 105. The image forming apparatus 100 is connected to the image forming apparatus 110, and the image forming apparatuses are connected to the application management server 105, by the network 106. The network 106 enables data communication between the image forming apparatus 100 and the image forming apparatus 110, and between the image forming apparatus 100 and application management server 105. The image forming apparatus 100 is a multi-function peripheral in which a photocopier including a scanner engine, a printer engine, and the like is provided with multiple functions such as scanner, printer, facsimile, and file sending functions. The image forming apparatus 100 includes a main unit 101 and an operating panel (or operating unit) 103. Likewise, the image forming apparatus 110 includes a main unit 102 and an operating panel 104. The main units 101 and 102 are capable of executing multiple functions, such as a copy function, a printer function, a facsimile function, and a file sending function. The operating panels 103 and 104 accept inputs made through user operations, and display operating screens for the various functions. The operating panels 103 and 104 may also function as independent information processing apparatuses such as tablet terminals.

Hardware Configuration Example—Image Forming Apparatus

Figure 2:
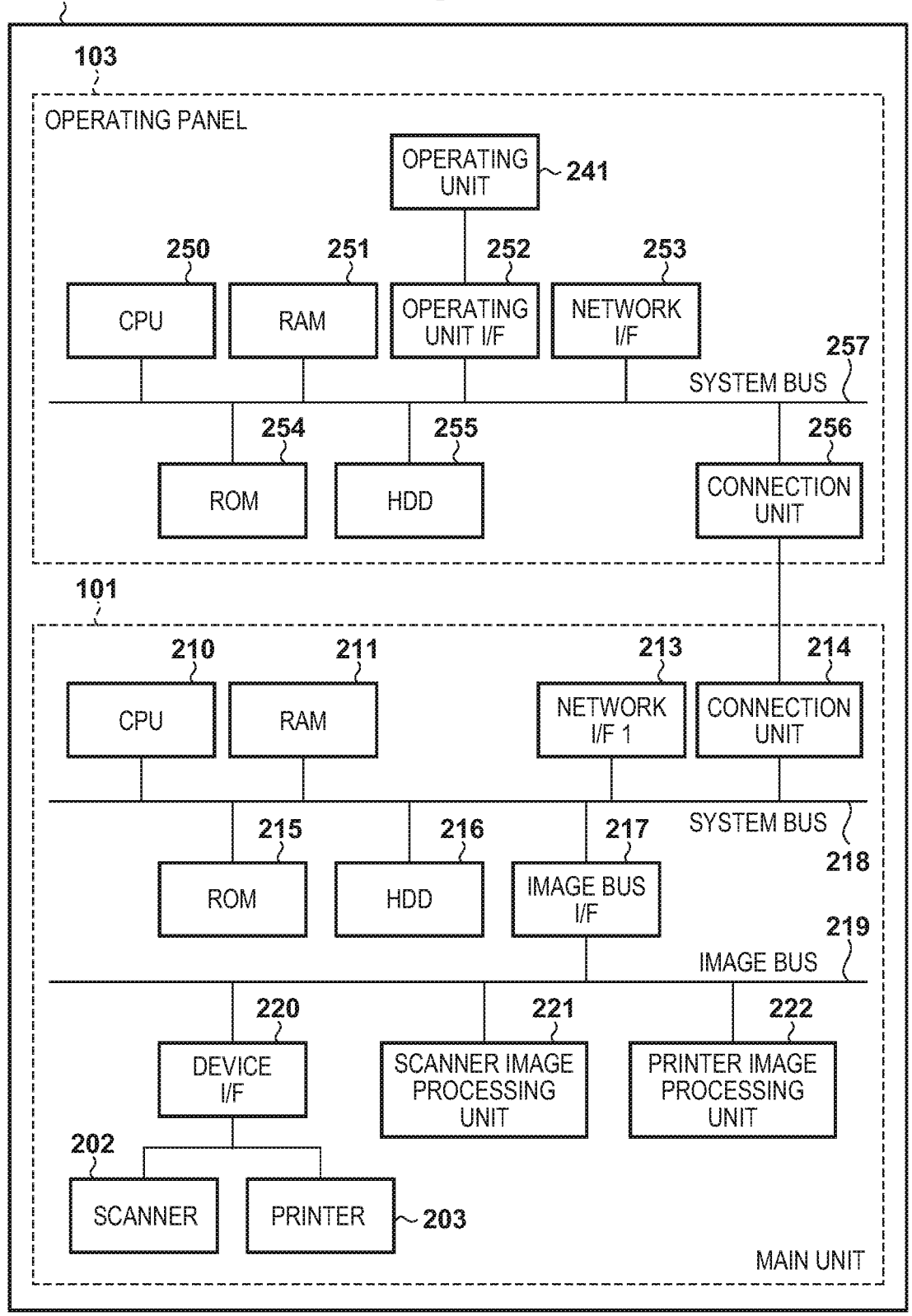
FIG. 2 is a diagram illustrating an example of the hardware configuration of an image forming apparatus 100.

FIG. 2 is a diagram illustrating an example of the hardware configuration of the image forming apparatus 100 according to the present embodiment. The image forming apparatus 100 includes the main unit 101 and the operating panel 103. The main unit 101 includes a CPU 210, RAM 211, a network I/F 1 213, and a connection unit 214. The main unit 101 further includes ROM 215, an HDD 216, an image bus I/F 217, and a system bus 218. "CPU" stands for "central processing unit". "RAM" stands for "random access memory". "ROM" stands for "read-only memory". "HDD" stands for "hard disk drive". The main unit 101 further includes an image bus 219, a device I/F 220, a scanner image processing unit 221, a printer image processing unit 222, a scanner 202, and a printer 203 as processing units related to printing and scanning. Note that the scanner 202 and the scanner image processing unit 221 are only provided if necessary.

The CPU 210 is a processor that functions as a controller for controlling the main unit 101 as a whole, and carries out programmed processing by executing programs stored in the RAM 211 and the like. The RAM 211 is memory for temporarily storing image data, processes (programs and the like) required for software operations, and so on.

The connection unit 214 connects to a connection unit 256 of the operating panel 103 to facilitate two-way communication between the main unit 101 and the operating panel 103. The main unit 101 and the operating panel 103 can be separated between the connection unit 256 and the connection unit 214. Likewise, in the image forming apparatus 110, which has the same configuration as the image forming apparatus 100, the main unit 102 and the operating panel 104 can be separated.

The network I/F 1 213 connects to a trunk network such as the network 106. The trunk network is a network through which various types of communication data, such as print job data and scan job data, flow.

The ROM 215 is a ROM in which a system boot program and the like are stored. The HDD 216 is an external storage device, and stores system software, image data, configuration information, and the like.

The image bus I/F 217 is a bus bridge that connects the system bus 218 and the image bus 219 and carries out data conversion. The system bus 218 is a shared data exchange path among the various components constituting the main unit 101. The image bus 219 is a path, constituted by a PCI bus or IEEE 1394, that transfers image data at high speeds.

The device I/F 220 connects the scanner 202 and the printer 203, which are image input/output devices, and carries out synchronous/asynchronous image data conversion. The scanner image processing unit 221 corrects, processes, and edits input images. The printer image processing unit 222 carries out correction, resolution conversion, and so on on print output image data, in accordance with the capabilities of the printer.

The operating panel 103 includes a CPU 250, RAM 251, an operating unit I/F 252, an operating unit 241, a network I/F 253, and the connection unit 256. The operating panel 103 further includes ROM 254, an HDD 255, and a system bus 257.

The CPU 250 is a processor that functions as a controller for controlling the operating panel 103 as a whole, and carries out programmed processes by executing programs stored in the RAM 251 and the like. The RAM 251 is a memory for temporarily storing image data, processes required for software operations, and so on.

The operating unit I/F 252 is an interface with the operating unit 241, and outputs, to the operating unit 241, image data to be displayed in the operating unit 241. The operating unit I/F 252 also sends, to the CPU 250, information input by a user through the operating unit 241.

The connection unit 256 connects to the connection unit 214 of the main unit 101, and facilitates the communication of processing details (data, messages, and so on) from both the main unit 101 and operating panel 103.

The ROM 254 is a ROM in which a system boot program is stored. The HDD 255 is an external storage device, and stores application programs, image data, configuration information, and the like. Large-capacity non-volatile memory may be used as the external storage device instead of the HDD 255. Note that the hardware configurations illustrated here are merely examples, and may be added to or subtracted from as necessary.

Hardware Configuration Example—Application Management Server

FIG. 3 is a diagram illustrating an example of the hardware configuration of the application management server 105 according to the present invention. Application management server 105 includes a control unit 300 and an operating unit 317. The control unit 300 includes a CPU 310, RAM 311, an operating unit I/F 312, and a network I/F 313 as processing units related to the operating unit. The control unit 300 further includes a ROM 314, an HDD 315, and a system bus 316. The CPU 310 is a controller for controlling the control unit 300 as a whole. The RAM 311 is memory for temporarily storing image data, processing required for software operations, and so on.

The operating unit I/F 312 is an interface with the operating unit 317, and outputs, to the operating unit 317, image data to be displayed in the operating unit 317. The operating unit I/F 312 also sends, to the CPU 310, information input by a user through the operating unit 317. The network I/F 313 is an interface that exchanges information with an external device. "External device" refers to the image forming apparatus 100, for example. The ROM 314 is a boot ROM, and holds a system boot program. The HDD 315 is an external storage device, and stores system software, application programs, application program management information, image data, configuration information, and the like. The system bus 316 is a shared data exchange path among the various components constituting the control unit 300. Note that the hardware configurations illustrated here are merely examples, and may be added to or subtracted from as necessary.

Example of Configuration of Software and Other Modules—Operating Panel, Etc.

FIG. 4 is a diagram illustrating an example of the module configuration of the operating panel 103 and the like according to the present invention. An operating system (OS) 401 manages and controls the resources of the operating panel 103 as a whole. An Application Programming Interface-1 (API-1) 402 is an interface for applications running on the OS 401. Applications access resources of the operating panel 103, execute commands using the CPU, and so on through the API-1. A controller control unit 403 is a controller control unit running on the OS 401, and controls the operating unit 241 and the like.

A network traffic management unit 404 manages a history of network traffic running through a network I/F 253. A virtual machine 405 is an optimal execution environment for executing a specific application, and is realized by a Java (registered trademark) virtual machine or the like, for example. An API-2 406 is an interface through which an application running in the virtual machine 405 uses the controller control unit 403, the network traffic management unit 404, the API-1 402, and the like. An application management application 407 manages applications running in the virtual machine 405. The application management application 407 carries out control such as downloading, uploading, deleting, activating/deactivating, and so on of applications, which will be described later. Applications 408 are applications running in the virtual machine 405. In this configuration, and application having a desired function can be installed and run as appropriate in the operating panel 103. In the present embodiment, the operating panel 103 obtains an application program to be installed from the application management server 105 via the main unit 101, in response to a user instruction from the operating unit 241. The obtained program is stored in the ROM 254 or the HDD 255 and installed in the operating panel 103, and the function of the program is realized by loading the program into the RAM 211 and executing the program when starting up operating panel 103.

Processing by Application Management Application in Operating Panel when Starting Image Forming Apparatus FIG. 5 is a flowchart illustrating the details of processing by the operating panel 103, carried out when the operating panel 103, which is connected to the main unit 101 of the image forming apparatus 100, is removed (i.e., disconnected from the main unit 101), connected to the main unit of another image forming apparatus, and that the image forming apparatus is then started up. This process is stored in the ROM 254 or the HDD 255 as the application management application 407, and is loaded into the RAM 251 and executed when the image forming apparatus 100 is started up. Note that when the image forming apparatus is started up, both the operating panel and the main unit are started up. FIG. 5 illustrates an installation control sequence in which an application installed in the operating panel 103 under predetermined conditions is reinstalled.

In step S501, the application management application 407 refers to a serial ID of the main unit, stored in the HDD 216, via the connection units 256 and 214. This ID is an ID of the main unit last connected before the operating panel was started up. The serial ID is merely one example, and the ID need not be a serial ID as long as it is identification information unique to the main unit.

Next, in step S502, the application management application 407 determines whether or not the serial ID of the main unit stored in the HDD 255 at the time of the previous startup is present. If this is the first startup, there is no main unit serial ID being held in step S502, and thus the process moves to step S505. If there is a main unit serial ID, however, the process moves to step S503.

Next, in step S503, the application management application 407 compares the serial ID of the main unit stored in the HDD 255 at the time of the previous startup with the serial ID referred to in step S501. If the two serial IDs match, the operating panel 103 is determined to be connected to the same main unit as during the previous startup, and thus the process moves to step S507. However, if the two serial IDs are different, the operating panel 103 is determined to be connected to a different main unit from the main unit connected to during the previous startup. In this case, in step S504, the application management application 407 uninstalls all of the applications 408 installed in the operating panel 103 and delete those applications from the HDD 255. Next, in step S505, the serial ID stored in the HDD 255 of the operating panel 103 at the time of the previous startup is overwritten with the serial ID of the main unit 102 currently connected. If this is the first startup, the serial ID is newly recorded. This ID is the ID of the main unit that was connected last, referred to in step S501. Next, in step S506, the application management application 407 refers to information of the applications 408 recorded in the HDD 216 of the main unit 102. This information is a list of application programs, managed by the application management server 105, that can be installed in the operating panel 103, for example. All of the applications 408 are obtained from the application management server 105 on the basis of the referenced information, and are installed in the HDD 255 of the operating panel 103. Applications saved in the HDD 216 of the main unit may be installed at this time. In step S507, the application management application 407 launches the applications 408 that are installed.

Table 1 is an application management table, which is an example of information of the applications 408 recorded in the HDD 216 of the main unit 102. When an application 408 has been installed in the operating panel 103 (or 104), an ID and application name of the application 408 installed in the connected operating panel 103 is recorded and held in the HDD 216 of the main unit 102 connected at the time of that installation. When an operating panel application is deleted, the information pertaining to that application (the ID and name) is also deleted from the application management table. If the application management table is held in the HDD 216 of the main unit, the operating panel 103 creates, updates, or deletes the application management table by accessing the HDD 216 via the connection units 256 and 214 or by making write requests to the main units 101 and 102. Note that this application management table may be held in operating panel 103. In this case, the application management table is saved in the HDD 255.

TABLE 1

| APPLICATION ID | APPLICATION NAME |
|---|---|
| 1 | SCANNING APP_1 |
| 2 | TABULATING APP_2 |
| 3 | AUTHENTICATION APP_3 |
| 4 | PRINTING APP_4 |

Figure 6:
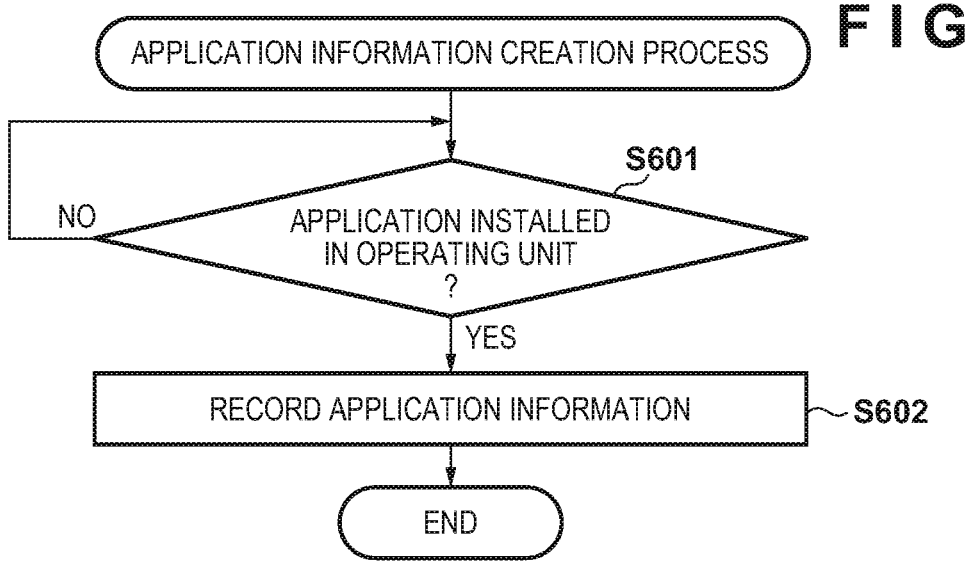
FIG. 6 is a diagram illustrating an example of a flowchart indicating the details of processing for creating application information, according to the first embodiment.

Next, details of a process for creating the application management table of Table 1 will be described using the flowchart in FIG. 6. This process is stored in the ROM 215 (if rewritable) or the HDD 216 as the application management application 407, and is loaded into the RAM 211 and executed by the CPU 210 when the image forming apparatus 100 is started up. In this case, the application management application 407 is executed by the main units 101 and 102, and thus the main units 101 and 102 also have the configuration illustrated in FIG. 4. However, the application execution environment provided by the main units 101 and 102, such as the APIs, virtual machine, OS, and so on, may differ from those of the operating panel 103.

In step S601, the application management application 407 determines, via the connection units 214 and 256, whether the applications 408 have been installed in the HDD 255 of the operating panel (also called "operating unit") 103. If installed, the process moves to step S602, but if not installed, the process of step S601 is repeated. In step S602, the application IDs and application names of the applications 408 installed in step S601 are recorded in the HDD 216. In other words, the process of FIG. 6 is a process that stands by in step S601 for the applications to be installed in the operating panel 103 through the process of FIG. 5, and adds records to the application management table by executing step S602 when it is determined that the applications have been installed. The process of FIG. 6 may furthermore be executed when installing applications in response to instructions from a user or the like. The main unit 101 is notified that the applications have been installed by the application management application 407 running in the operating panel 103, for example. The IDs and names of the installed applications are also communicated at that time.

According to the present embodiment as described thus far, only applications 408 associated with the application IDs managed by the connected main unit can be installed in the operating panel. Accordingly, even if the main unit is reconnected to an operating panel in which other applications 408 are installed, only the applications 408 managed by the main unit can be provided to the user.

Additionally, if the combination of the operating panel and the main unit is different from the previous combination, all of the applications in the operating panel are first deleted, and then only the applications stored in the main unit are installed. This provides an effect of reducing the storage capacity consumed in the HDD 255 of operating panel.

Second Embodiment

The first embodiment describes an example in which all of the applications 408 installed in the operating panel are deleted if the combination of the main unit in the operating panel is different. The first embodiment further describes an example in which after the applications 408 have been deleted, the applications 408 associated with the application IDs recorded in the main unit are reinstalled. A second embodiment will describe an example in which the operating panel stores the serial ID of the main unit connected when the applications 408 are installed, on an application 408-by-application 408 basis. Although the application management table was created for the purpose of managing installed applications in the first embodiment, the table is used to store the serial ID of the main unit on an application-by-application basis in the present embodiment.

Figure 7:
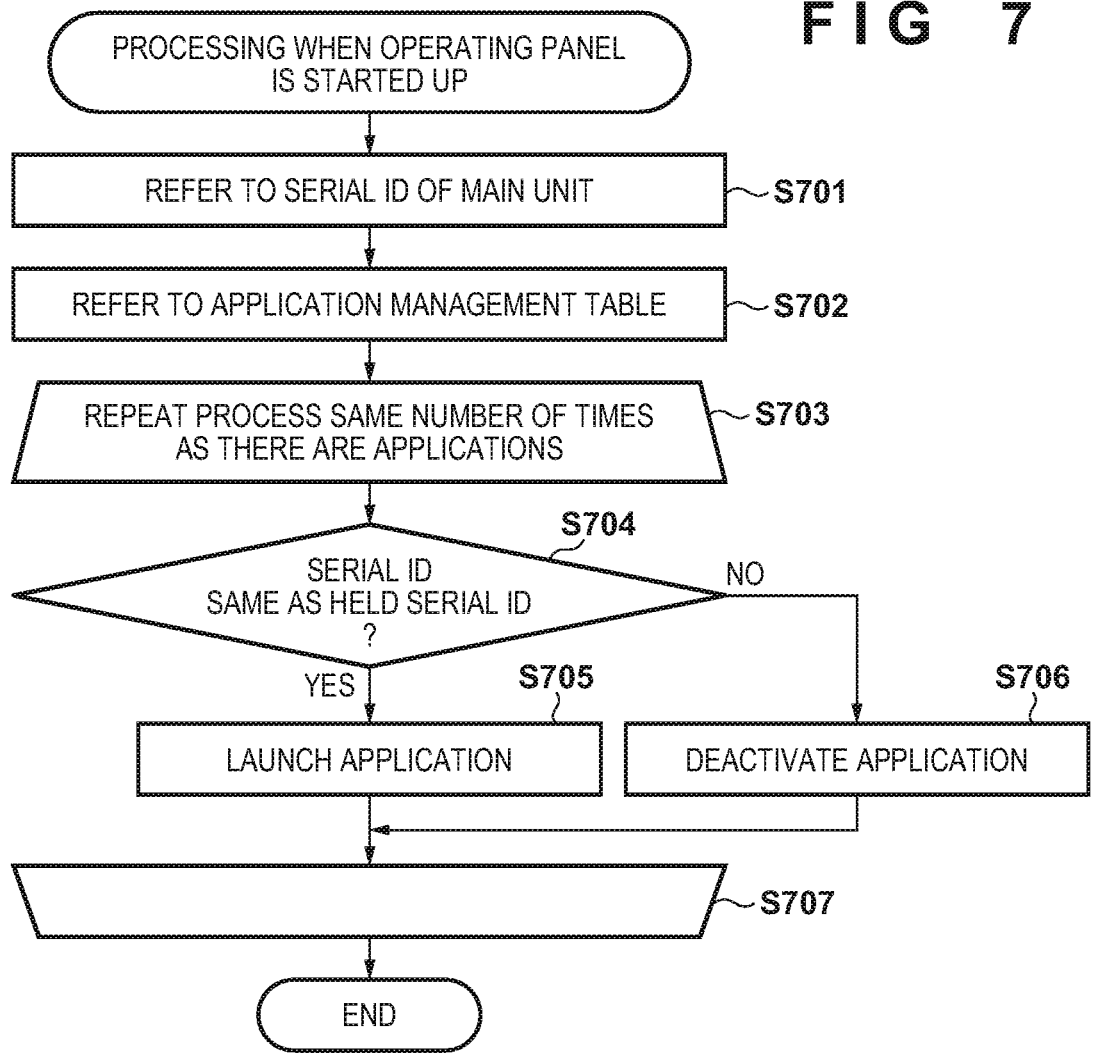
FIG. 7 is a diagram illustrating an example of a flowchart indicating the details of processing by the operating panel 103 when the image forming apparatus is started up, according to a second embodiment.

Processing by Application Management Application in Operating Panel when Starting Image Forming Apparatus FIG. 7 is a flowchart illustrating the details of processing by the operating panel 103 when the operating panel 103, which is connected to the main unit 101 of the image forming apparatus 100, is removed and connected to the main unit 102 of the other image forming apparatus 110, and the image forming apparatus is started up. This process is stored in the ROM 254 or the HDD 255 as the application management application 407, and is loaded into the RAM 251 and executed when the image forming apparatus 100 is started up.

In step S701, the application management application 407 refers to the serial ID of the main unit, stored in the HDD 216, via the connection units 256 and 214.

Next, in step S702, the application management application 407 refers to the application management table recorded in the HDD 255 of the operating panel 103. Table 2 is a table illustrating an example of the application management table.

TABLE 2

| APPLICATION ID | APPLICATION NAME | MAIN UNIT SERIAL ID |
|---|---|---|
| 1 | SCANNING APP_1 | 0001 |
| 2 | TABULATING APP_2 | 0002 |
| 3 | AUTHENTICATION APP_3 | 0001 |
| 4 | PRINTING APP_4 | 0001 |

Table 2 indicates a case where four applications 408 (with IDs of 1 to 4) have been installed from the operating panel 103 (or 104). The IDs and names of the applications 408 installed in the HDD 255 of the operating panel 103 (or 104), and the serial ID of the main unit 101 (or 102) connected at that time, are recorded and held. This sequence will be described in detail later with reference to FIG. 8. The application management table according to the present embodiment is a table for associating identification information of the applications installed in the operating panel with the main unit (the serial ID of the main unit) connected at the time when those applications were installed in the operating panel, for each operating panel (operating unit). In the present embodiment, the associated main unit is the main unit indicated by the ID held in the application management table.

In step S703, a single application 408 recorded in application management table is taken as an application of interest, in order of application ID. The processing up to step S707 is then repeated the same number of times as there are applications.

In step S704, the main unit serial ID from when the application 408 of interest was installed (the ID of the main unit corresponding to the application of interest) is compared with the serial ID of the main unit referred to in step S701 (the ID of the connected main unit), and the process moves to step S705 if the two serial IDs are determined to match. In step S705, the application management application 407 launches the application 408 of interest normally. On the other hand, if it is determined in step S704 that the two serial IDs do not match, the application management application 407 deactivates the application 408 of interest, and does not launch the application, in step S706. At this time, if there are controls such as buttons for executing application, menus or the like indicating options, and so on, those are deactivated as well.

In step S707, the processing ends after the processes from step S704 to step S706 have been repeated a number of times equivalent to the number of applications 408 registered in the application management table. In other words, the application of interest is replaced with an application having the ID next after the ID of the current application of interest, for example, after which the process returns to step S704. The process ends if there is no next application.

Figure 8:
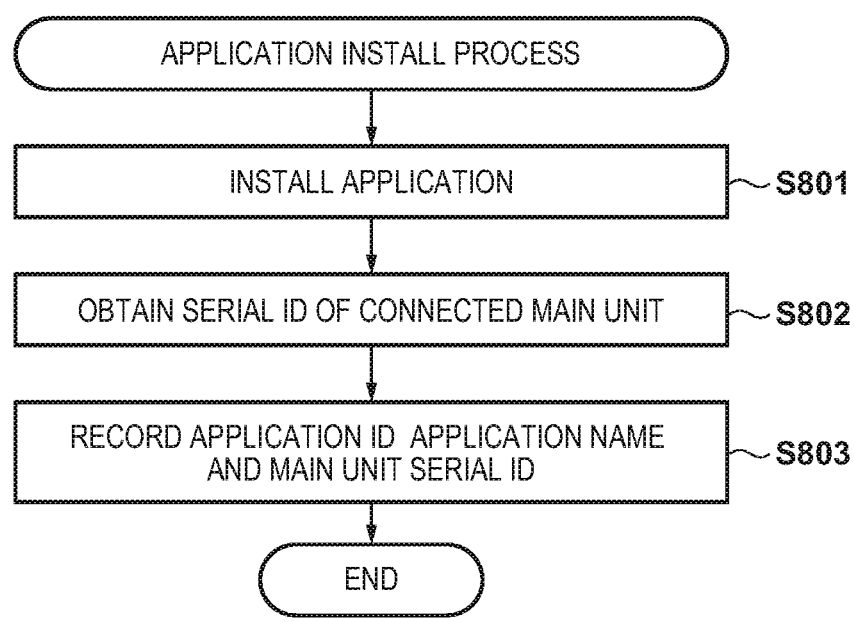
FIG. 8 is a diagram illustrating an example of a flowchart indicating the details of processing for creating application information, according to the second embodiment.

Next, details of a process for creating the application management table will be described using the flowchart in FIG. 8. This process is also stored in the ROM 254 or the HDD 255 as the application management application 407, and is loaded into the RAM 251 and executed by the CPU 250 when the image forming apparatus 100 is started up. Alternatively, an instruction to install an application made by a user or the system of the image forming apparatus may be used as a trigger, for example.

In step S801, the application management application 407 installs a designated application 408 in the HDD 255 of the operating panel 103. The application to be installed is, for example, downloaded from the application management server 105 via the main units 101 and 102, and is then installed. Next, in step S802, the operating panel 103 refers to the serial ID of the main unit, stored in the HDD 216, via the connection units 256 and 214. Next, in step S803, the application ID and application name, as well as the serial ID of the main unit referred to in step S802, are recorded into the HDD 255 as a single record, for each of the applications 408 installed in step S801. When an application is uninstalled, the corresponding record is deleted from the application management table. Note that during an uninstall, it is also possible, for example, to verify the ID of the main unit in which the application to be uninstalled is installed, against the ID of the currently-connected main unit, and permit the application to be deleted only if these IDs match.

FIGS. 9A to 9D are diagrams illustrating examples of images displayed in the operating panel 103. FIG. 9A is a diagram illustrating an image displayed in the operating panel 103 after the processing of the flowchart in FIG. 7 has been carried out in a state where the operating panel 103 is connected to the main unit 102, for example. Buttons 911, 912, 913, and 914 are buttons corresponding to the respective applications, and applications are executed in response to these buttons being pressed. If the button is white, the application can be used (is active), whereas if a button is gray, the application cannot be used (is inactive).

In table 2, a main unit serial ID of "0001" indicates the main unit 101, and a main unit serial ID of "0002" indicates the main unit 102. According to the processing of the flowchart in FIG. 7, if the operating panel 103 is connected to the main unit 102, only the applications 408 corresponding to the main unit serial ID of "0002" in Table 2 can be used. Other applications 408 are inactive. The applications corresponding to the buttons 911, 913, and 914 in FIG. 9A correspond to the main unit serial ID of "0001" in Table 2, and because these applications were installed when the main unit 101 was connected, these buttons are deactivated.

In the example illustrated in FIG. 9B, only the button 912 is displayed, and the buttons 911, 913, and 914 are not displayed. The display may be made as indicated in FIG. 9A, or as indicated in FIG. 9B. In either case, the deactivated applications are displayed so that those applications cannot be selected.

FIG. 9C is a diagram illustrating an image of the button display made when the operating panel 103 has been connected to the main unit 101. Unlike FIG. 9A, application buttons 921, 923, and 924 are active. However, a button 922 corresponds to an application installed when the main unit 102 was connected, and thus the button is deactivated.

In the example of FIG. 9D, the buttons 921, 923, and 924 are displayed, and the button 922 is not displayed. The display may be made as indicated in FIG. 9C, or as indicated in FIG. 9D.

According to the present embodiment as described thus far, the combinations including the main unit connected when the applications 408 were installed from the operating panel 103 are stored on an application 408-by-application 408 basis. This makes it possible to prevent the applications 408 from being used in different combinations.

Additionally, processing such as that carried out in the first embodiment, where all of the applications in the operating panel are deleted and then reinstalled if the operating panel-main unit combination is different, is not carried out in the present embodiment. This has an effect of making it possible to use the applications immediately.

Furthermore, applications may be installed in the operating panel 103 using the startup of the image forming apparatus 100 as a trigger, for example. In this case, after the image forming apparatus is started up, a list of the applications registered in the main unit to which the operating panel 103 is connected is verified against a list of applications installed in the operating panel 103 from the currently-connected main unit. An application present in the list of applications registered in the main unit but not present in the list of applications installed from that main unit is then newly-installed through the sequence illustrated in FIG. 8. Conversely, an application not present in the list of applications registered in the main unit but present in the list of applications installed from the main unit is uninstalled according to the points described earlier. Thus the processing may be carried out in this manner as well. Applications installed from the main unit connected to the operating panel 103 can be identified by referring to the main unit serial IDs in the application management table. Doing so makes it possible to update the applications installed in the operating panel 103 in response to changes in the list of applications stored in the main unit 101.

Third Embodiment

In the second embodiment, the operating panel 103 determines whether to activate or deactivate an application 408 when the image forming apparatus 100 is started up, but the present embodiment will describe an example in which the main unit 101 makes the determination.

Note that the present embodiment assumes that the application management application 407 and application management table are present in the main units 101 and 102. In this case, the application management application 407 is executed by the main units 101 and 102, and thus the main units 101 and 102 also have the configuration illustrated in FIG. 4. However, the application execution environment provided by the main units 101 and 102, such as the APIs, virtual machine, OS, and so on, may differ from those of the operating panel 103.

Processing by Application Management Application in Main Unit when Starting Image Forming Apparatus FIG. 10 is a flowchart illustrating the details of processing by the main unit 102 when the operating panel 103, which is connected to the main unit 101 of the image forming apparatus 100, is removed and connected to the main unit 102 of the other image forming apparatus 110, and the image forming apparatus 100 is started up. This process is stored in the ROM 215 or the HDD 216 as the application management application 407, and is loaded into the RAM 211 and executed by the CPU 210 when the image forming apparatus 100 is started up.

In step S1001, the application management application 407 refers to a serial ID of the operating panel 103, stored in the HDD 255, via the connection units 214 and 256.

Next, in step S1002, the application management application 407 refers to the application management table recorded in the HDD 216 of the main unit 102. Table 3 is a table illustrating an example of the application management table.

TABLE 3

| APPLICATION ID | APPLICATION NAME | OPERATING PANEL SERIAL ID |
| --- | --- | --- |
| 1 | SCANNING APP_1 | 0001 |
| 2 | TABULATING APP_2 | 0002 |
| 3 | AUTHENTICATION APP_3 | 0001 |
| 4 | PRINTING APP_4 | 0001 |

Table 3 indicates a case where the operating panel 103 (or 104) has installed the applications 408. The main unit obtains the IDs and names of the applications 408 installed in the HDD 255 of the operating panel 103 (or 104), and the serial ID of the operating panel 103 (or 104) connected at that time, via the connection units 214 and 256, and records that information in the HDD 216. This sequence will be described in detail later with reference to FIG. 11. The application management table according to the present embodiment is a table for associating identification information of the applications installed in the operating panel with the main unit connected at the time when those applications were installed in the operating panel. In the present embodiment, the associated main unit is the main unit held in the application management table.

In step S1003, a single application 408 recorded in application management table is taken as an application of interest. The processing up to step S1006 is then repeated the same number of times as there are applications.

In step S1004, the operating panel serial ID from when the application 408 of interest was installed (the ID of the operating panel corresponding to the application of interest) is compared with the operating panel serial ID referred to in step S1001 (the ID of the connected operating panel). If the two serial IDs are determined to match, the process moves to step S1006. However, if the two serial IDs are determined not to match in step S1004, the process moves to step S1005. In step S1005, the application management application 407 deactivates the application 408 of interest in operating panel 103, via the connection units 214 and 256.

Note that the installed applications 408 are launched in the process for starting up the operating panel 103, which is started up in response to the image forming apparatus 100 being started up. As such, a process for launching the applications need not be carried out in the sequence of FIG. 10. However, if the applications are not launched in the process of starting up the operating panel 103, the application of interest is launched if it is determined in step S1004 that the serial IDs match.

In step S1006, the processing ends after the processes of step S1004 and step S1005 have been repeated a number of times equivalent to the number of applications 408 registered in the application management table. In other words, the application of interest is replaced with an application having the ID next after the ID of the current application of interest, for example, after which the process returns to step S1004. The process ends if there is no next application.

Figure 11:
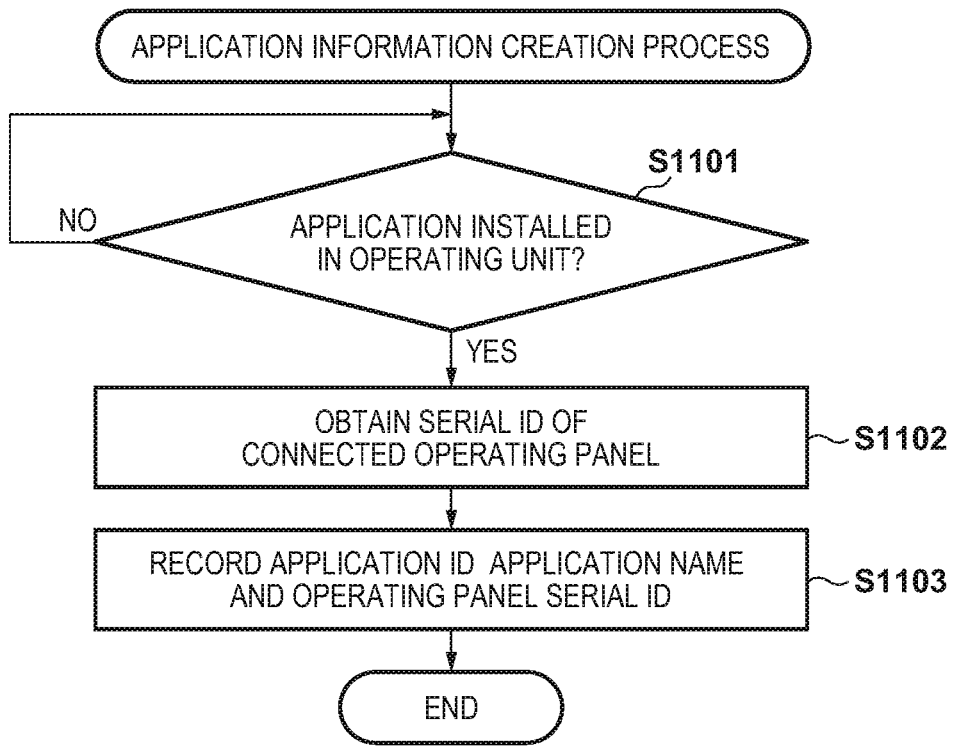
FIG. 11 is a diagram illustrating an example of a flowchart indicating the details of processing for creating application information, according to the third embodiment.

Next, details of a process for creating the application management table of Table 3 will be described using the flowchart in FIG. 11. This process is stored in the ROM 215 or the HDD 216 as the application management application 407, and is loaded into the RAM 211 and executed by the CPU 210 when the image forming apparatus 100 is started up.

In step S1101, the application management application 407 determines, via the connection units 214 and 256, whether the applications 408 have been installed in the HDD 255 of the operating panel 103. If installed, the process moves to step S1102, but if not installed, the process of step S1101 is repeated. In step S1102, the operating panel 103 refers to the operating panel serial IDs stored in the HDD 255, via the connection units 214 and 256.

In step S1103, the application ID and application name, along with the operating panel serial ID referred to in step S1102, are recorded into the HDD 216 as application management table records, for each of the applications 408 installed in step S1101.

When an application is uninstalled, the corresponding record is deleted from the application management table. Note that during an uninstall, it is also possible, for example, to verify the ID of the operating panel in which the application to be uninstalled is installed, against the ID of the currently-connected operating panel, and permit the application to be deleted only if these IDs match.

According to the present embodiment as described thus far, the combinations including the main units 101 and 102 connected when the applications 408 were installed from the operating panel 103 are stored on an application 408-by-application 408 basis. This makes it possible to prevent the applications 408 from being used with different combinations, in response to instructions from the main units 101 and 102.

Fourth Embodiment

The second and third embodiments describe deactivating the launching of the applications 408 for combinations having different serial IDs, but it is also possible to avoid deactivating the applications 408 in accordance with the types of those applications.

Table 4 is a table indicating an example of an application management table recorded into the HDD 255 of the operating panel 103.

TABLE 4

| APPLICATION ID | APPLICATION NAME | MAIN UNIT SERIAL ID | PRICE |
|---|---|---|---|
| 1 | SCANNING APP_1 | 0001 | 3000 |
| 2 | TABULATING APP_2 | 0002 | 5000 |
| 3 | AUTHENTICATION APP_3 | 0001 | 2000 |
| 4 | PRINTING APP_4 | 0001 | 0 |

Table 4 indicates a case where the applications 408 have been installed from the operating panel 103 (or 104). The IDs and names of the applications 408 installed in the HDD 255 of the operating panel 103 (or 104), and the serial ID of the main unit 101 (or 102) connected at that time, are recorded and held. Information of the prices of the applications 408 is held as well. In this example, an application ID of "4" and an application name of "printing app 4" has a cost of "0 yen".

Figure 12:
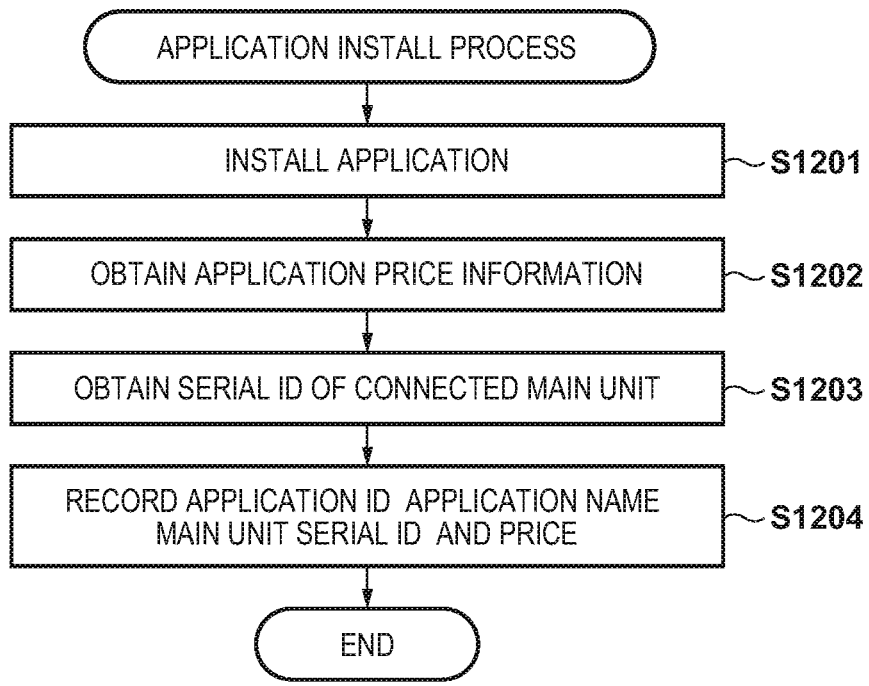
FIG. 12 is a diagram illustrating an example of a flowchart indicating the details of processing for creating application information, according to another embodiment.

Next, details of a process for creating Table 4 will be described using the flowchart in FIG. 12. This process is stored in the ROM 254 or the HDD 255 as the application management application 407, and is loaded into the RAM 251 and executed by the CPU 250 when the image forming apparatus 100 is started up.

In step S1201, the application management application 407 installs an application 408 in the HDD 255 of the operating panel 103. Next, in step S1202, the price information of the application is referred to from the application 408. The price information may be obtainable as an attribute of the application file, for example. Next, in step S1203, the operating panel 103 refers to the serial ID of the main unit, stored in the HDD 216, via the connection units 256 and 214. Next, in step S1204, the application ID and application name, the serial ID of the main unit referred to in step S1203, and the price referred to in step S1202 are recorded into the HDD 216, for each of the applications 408 installed in step S1201.

Although this flowchart indicates the price as being referred to from the application, the price may instead be obtained from the application management server 105 and referred to. As the price information, the application management table may also simply indicate whether the application is free or paid.

FIG. 13 is a flowchart illustrating the details of processing by the application management application 407 when the application management table indicated in Table 4 is used. Aside from step S1304 of the processing being inserted immediately after step S1303, which corresponds to step S703, the details are the same as those illustrated in FIG. 7, and thus steps aside from step S1304 will not be described.

In step S1304 of this flow, the application management application 407 refers to the application management table, and if the price of the application of interest is "0", the process moves to step S1306 and the application is launched, without making a determination regarding the main unit serial ID. If the price is not "0", the process moves to step S1305, where the process of comparing the main unit serial IDs is carried out.

Figure 14A:
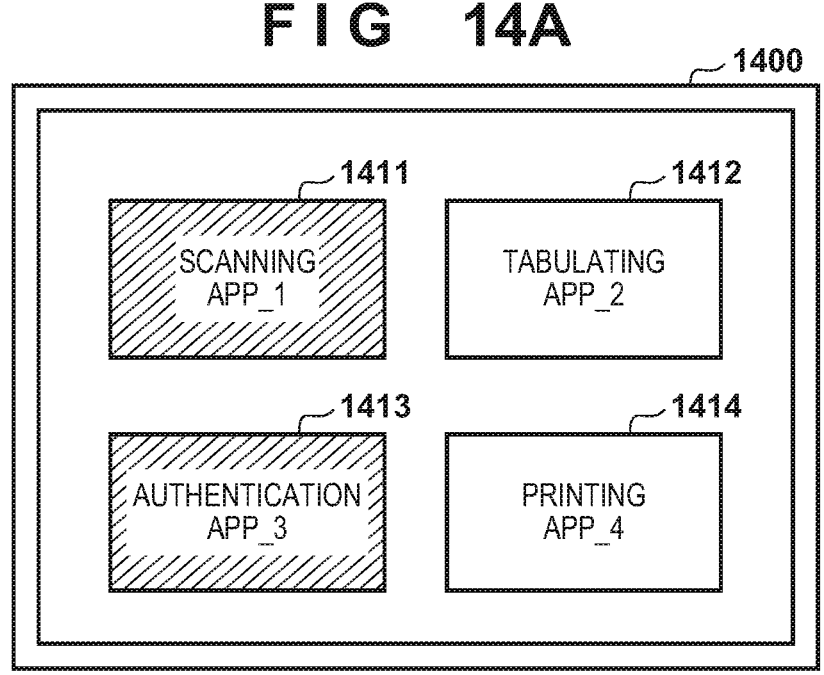
FIG. 14A is a diagram illustrating an example of an image displayed in the operating panel 103, according to another embodiment.
Figure 14B:
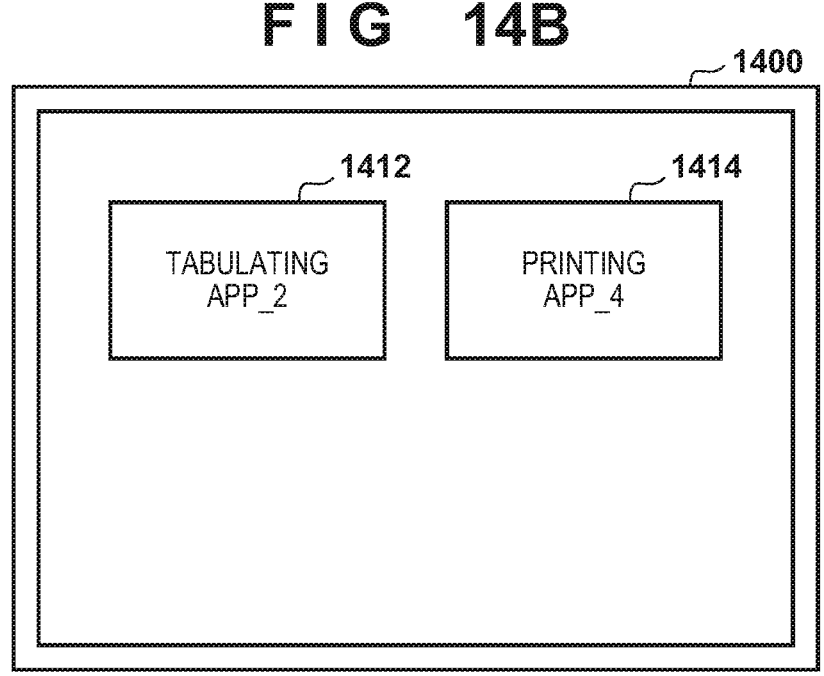
FIG. 14B is a diagram illustrating an example of an image displayed in the operating panel 103, according to another embodiment.

FIGS. 14A and 14B are diagrams illustrating examples of images displayed in the operating panel 103 when the processing of the flowchart in FIG. 13 is carried out. According to the processing of the flowchart in FIG. 7, the operating panel 103 is connected to the main unit 102, and thus only the applications 408 corresponding to the main unit serial ID of "0002" in Table 2 can be used. However, according to the processing of the flowchart in FIG. 13, the application having an application ID of "4" and an application name of "printing app_4", which has a price of "0", can also be used. In the example of FIG. 14A, a button 1412 is active, and furthermore, the price of the "printing app_4" is "0", and thus a button 1414 for that application is active as well. Buttons 1411 and 1413 are grayed-out, indicating that the functions of these buttons are inactive even if the buttons are pressed. In the example illustrated in FIG. 14B, only the buttons 1412 and 1414 are displayed, and the buttons 1411 and 1413 are not displayed. The display may be made as indicated in FIG. 14A, or as indicated in FIG. 14B.

Although the present embodiment is based on the second embodiment, the present embodiment can also be applied in a case such as the third embodiment, where the application management table is held in the main unit and the main unit activates (launches) and deactivates the applications.

Fifth Embodiment

The fourth embodiment describes an example of an application having a price of "0". The present embodiment, however, describes an example in which an application registered in the application management table can be used regardless of whether or not the main unit and operating panel serial IDs match, by making the main unit serial ID corresponding to the application "shared".

TABLE 5

| APPLICATION ID | APPLICATION NAME | MAIN UNIT SERIAL ID |
|---|---|---|
| 1 | SCANNING APP_1 | 0001 |
| 2 | TABULATING APP_2 | 0002 |
| 3 | AUTHENTICATION APP_3 | 0001 |
| 4 | PRINTING APP_4 | SHARED |

Figure 15:
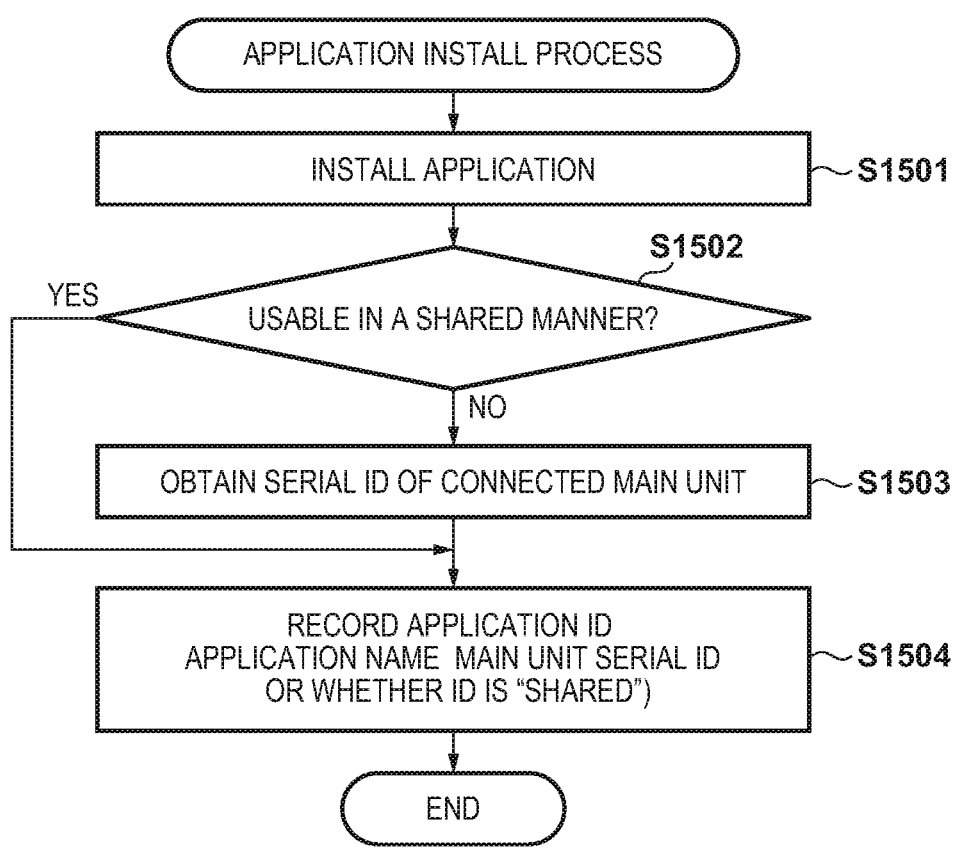
FIG. 15 is a diagram illustrating an example of a flowchart indicating the details of processing for creating application information, according to another embodiment.

Next, details of a process for creating Table 5 will be described using the flowchart in FIG. 15. This process, too, is stored in the ROM 254 or the HDD 255 as the application management application 407, and is loaded into the RAM 251 and executed by the CPU 250 when the image forming apparatus 100 is started up. Alternatively, the process may be started using an instruction to install an application as a trigger, for example.

In step S1501, the application management application 407 installs an application 408 in the HDD 255 of the operating panel 103. Next, in step S1502, it is determined whether or not the application installed in step S1501 is an application that can be used in a shared manner. "Used in a shared manner" means that the application can be shared for use among multiple main units, for example. Whether or not an application can be used in this manner can be specified by an attribute in the application file, for example. The attribute may be included in a manifest file or the like, for example. If the application can be used in a shared manner, the process moves to step S1504. If the application cannot be used in a shared manner, in step S1503, the operating panel 103 refers to the serial ID of the main unit, stored in the HDD 216, via the connection units 256 and 214. Next, in step S1504, the application ID and application name, as well as the serial ID of the main unit referred to in step S1503, are recorded into the HDD 216, for each of the applications 408 installed in step S1501. However, "shared" is recorded as the main unit serial ID for the application determined in step S1502 to be usable in a shared manner.

FIG. 16 is a flowchart illustrating the details of processing by the application management application 407 when the application management table indicated in Table 5 is used. Aside from step S1604 of the processing being added immediately after step S1603, which corresponds to step S703, the details are the same as those illustrated in FIG. 7, and thus steps aside from step S1604 will not be described.

In step S1604 of this flow, the application management application 407 refers to the application management table. If the main unit serial ID is "shared", the process moves to step S1606 and the application is launched, without making a determination regarding the main unit serial ID. If the ID is not "shared", the process moves to step S1605, where the process of comparing the main unit serial IDs is carried out.

According to the present embodiment as described thus far, an application defined as a shared application can be used regardless of whether or not the main unit and operating panel serial IDs match. Furthermore, the use of applications not defined as "shared" can be restricted so that the applications can be used only when the main unit-operating panel combination is the same as when the applications were installed, in the same manner as in the second and third embodiments.

Although the present embodiment is based on the second embodiment, the present embodiment can also be applied in a case such as the third embodiment, where the application management table is held in the main unit and the main unit activates (launches) and deactivates the applications.

OTHER EMBODIMENTS

In the fifth embodiment, an application for which the serial ID is set to a value of "shared" can be used regardless of the main unit-operating panel combination. In this case, it is necessary for the application to be defined as "shared" in advance. Accordingly, the configuration may be such that if, when an application is installed in the operating panel 103, the application has already been installed when a main unit having a serial ID was connected, the application is not newly installed. Instead, the serial ID of the connected main unit is added to the serial IDs in the application management table as a main unit with which the application can be used. As a result, it is possible that multiple serial IDs will be associated with the application. The application may be set to be usable if the serial ID of the connected main unit corresponds to one of the serial IDs for the application registered in the application management table.

Such a configuration makes it possible to use a single application when any of multiple main units has been connected. Moreover, restrictions on the usage of the application based on the connection relationship between the main unit and the operating panel can be maintained in the same manner as in the first to fourth embodiments.

Note that the stated configuration may, for example, be applied in the third embodiment, with the serial ID of the operating panel being stored, in association with the application, in the application management table held by the main unit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155886, filed Aug. 10, 2017, which is hereby incorporated by reference herein in its entirety.

What is claimed is:

1. An image forming apparatus comprising an operating unit in which applications can be installed and executed, and a main unit, wherein the operating unit and the main unit can be connected to and disconnected from each other, and the image forming apparatus further comprises:
    at least one memory storing instructions; and
    at least one processor that, upon executing stored instructions, functions as
        a holding unit configured to hold an application management table associating identification information of an application installed in the operating unit with a main unit connected at the time when the application was installed in the operating unit; and
        a control unit configured to, on the basis of the application management table, activate an application, among the applications installed in the operating unit, for which the main unit connected when the application was installed is the same as a currently-connected main unit, and deactivate the other applications,
    wherein the application management table further includes information indicating that an application that can be used in a shared manner among a plurality of main units is shared; and
    the control unit activates the application indicated as being shared, regardless of the connected main unit.

2. The image forming apparatus according to claim 1, wherein the operating unit includes the holding unit and the control unit.

3. The image forming apparatus according to claim 1, wherein the main unit includes the holding unit and the control unit.

4. The image forming apparatus according to claim 1, wherein the control unit carries out the process of activating and deactivating the application when the image forming apparatus is started up.

5. The image forming apparatus according to claim 1, wherein the application management table further includes information indicating that a free application is free; and
    the control unit activates the application indicated as being free, regardless of the connected main unit.

6. The image forming apparatus according to claim 1, wherein the application management table further indicates an association with a main unit that can use the application, in addition to the main unit connected at the time when the application was installed; and
    the control unit, on the basis of the application management table, activates an application, among the applications installed in the operating unit, for which the main unit indicated as associated with the application and the main unit connected when the application was installed are the same as a currently-connected main unit, and deactivates the other applications.

7. A non-transitory computer-readable medium storing a program that, when executed by a computer included in an image forming apparatus along with a main unit, capable of being connected to and disconnected from the main unit, and capable of installing and executing applications, causes the computer to function as:
    a holding unit configured to hold an application management table associating identification information of an application installed in the operating unit with a main unit connected at the time when the application was installed in the operating unit; and
    a control unit configured to, on the basis of the application management table, activate an application, among the applications installed in the operating unit, for which the main unit connected when the application was installed is the same as a currently-connected main unit, and deactivate the other applications,
    wherein the application management table further includes information indicating that an application that can be used in a shared manner among a plurality of main units is shared; and
    the control unit activates the application indicated as being shared, regardless of the connected main unit.

8. A non-transitory computer-readable medium storing a program that, when executed by a computer included in an image forming apparatus along with an operating unit, capable of being connected to and disconnected from the operating unit, and capable of installing and executing applications, causes the computer to function as:

a holding unit configured to hold an application management table associating identification information of an application installed in the operating unit with a main unit connected at the time when the application was installed in the operating unit; and a control unit configured to, on the basis of the application management table, activate an application, among the applications installed in the operating unit, for which the main unit connected when the application was installed is the same as a currently-connected main unit, and deactivate the other applications, wherein the application management table further includes information indicating that an application that can be used in a shared manner among a plurality of main units is shared; and the control unit activates the application indicated as being shared, regardless of the connected main unit.

9. A control method of an image forming apparatus including an operating unit in which an application can be installed and executed, and a main unit, wherein the operating unit and the main unit can be connected to and disconnected from each other, and the method comprising:

holding an application management table associating identification information of an application installed in the operating unit with a main unit connected at the time when the application was installed in the operating unit; and on the basis of the application management table, activating an application, among the applications installed in the operating unit, for which the main unit connected when the application was installed is the same as a currently-connected main unit, and deactivating the other applications, wherein the application management table further includes information indicating that an application that can be used in a shared manner among a plurality of main units is shared; and the control unit activates the application indicated as being shared, regardless of the connected main unit.

10. An information processing apparatus capable of connecting and disconnecting with an image processing apparatus, the image processing apparatus comprising:

at least one memory storing instructions; and at least one processor that, upon executing stored instructions, functions as an installation unit configure to install an application;

a first obtainment unit configure to obtain identification information of an image processing apparatus connected with the information processing apparatus from the image processing apparatus when installing the application;

a holding unit configured to hold a management table which associates identification information of the installed application with identification information of the image processing apparatus which has been connected with the information processing apparatus when the application was installed;

a second obtainment unit configure to obtain identification information of an image processing apparatus connected with the information processing apparatus from the image processing apparatus when activating the information processing apparatus; and a determination unit configured to determine whether or not the application can be used based on the management table and the identification information of the image processing apparatus which has been connected with the information processing apparatus when the information processing apparatus was activated, wherein the determination unit determines that the application associated with the identification information of the image processing apparatus stored in the management table can be used in a case where the identification information of the image processing apparatus which has been connected with the information processing apparatus when the information processing apparatus was activated is identical with the identification information of the image processing apparatus held by the management table, the image processing apparatus having been connected with the information processing apparatus when the application was activated.

11. The information processing apparatus according to claim 10, wherein the management table contains identification information for each of a plurality of image processing apparatuses and each of a plurality of applications.

12. The information processing apparatus according to claim 10, wherein the management table contains information indicating that an application is common to a plurality of image processing apparatuses for the application that is allowed to be commonly used by the plurality of image processing apparatuses, and wherein the determination unit determines that an application can be used regardless of an information processing apparatus connected with the image processing apparatus if the application is indicated as being allowed to be commonly used.

* * * * *